United States Patent
Dimion et al.

[11] Patent Number: 5,964,570
[45] Date of Patent: Oct. 12, 1999

[54] METHOD AND APPARATUS FOR HIGH SPEED VARIABLE TIER WIDTH LUMBER STACKING

[75] Inventors: George Dimion; Wayne Webber; Robert Hart; William R. Newnes; Steven W. Michell, all of Salmon Arm, Canada

[73] Assignee: CAE Electronics Ltd. CAE Electronique Ltee, St. Laurent, Canada

[21] Appl. No.: 08/900,122

[22] Filed: Jul. 25, 1997

Related U.S. Application Data

[60] Provisional application No. 60/023,091, Jul. 25, 1996.

[51] Int. Cl.$^6$ .................................................. B65G 57/10
[52] U.S. Cl. ................................. 414/791.6; 414/793.4; 414/794.3; 414/789.5; 198/419.2
[58] Field of Search .............................. 414/791.6, 793.4, 414/794.3, 788.9, 789.1, 789.5; 198/419.2, 419.3

[56] References Cited

U.S. PATENT DOCUMENTS

| | | | |
|---|---|---|---|
| 2,730,247 | 1/1956 | Lawson | 214/6 |
| 2,861,702 | 11/1958 | Mason | 214/6 |
| 3,169,646 | 2/1965 | Mason | 214/6 |
| 3,968,886 | 7/1976 | Leon | 214/6 |
| 4,892,458 | 1/1990 | Proulx | 414/791.6 |

*Primary Examiner*—Christopher P. Ellis
*Assistant Examiner*—Douglas Hess
*Attorney, Agent, or Firm*—Antony C. Edwards

[57] ABSTRACT

A tier forming and handling device for forming and handling sequential tiers of lumber from a flow of elongate boards translated on a first conveyor in a first flow direction, wherein the boards are aligned along their length generally perpendicularly to the first flow direction, having a mat forming mechanism for collecting, by selectively actuable hook stops, the flow of elongate boards against the hook stops so as to form a mat of lumber having a downstream end adjacent the hook stops and an upstream end whereagainst the flow of elongate boards may continue to collect into abutting adjacent array; a mat separator for separating, along the first conveyor, at a selectively adjustable separation location, a tier of lumber from the downstream end of the mat of lumber; and, a variable speed tier accelerator for conveying and selectively variably accelerating the tier of lumber, once separated along the first conveyor, from the first conveyor to a hoist stacker, wherein the selectively adjustable separation location is selectively adjustable along the first conveyor so as to selectively adjust a first dimension of the tier parallel to the first direction.

23 Claims, 9 Drawing Sheets

METHOD AND APPARATUS FOR HIGH SPEED VARIABLE TIER WIDTH LUMBER STACKING

CROSS REFERENCE TO RELATED APPLICATION

This application claims the benefit of U.S. Provisional Application No. 60/023,091 filed on Jul. 25, 1996.

FIELD OF THE INVENTION

This invention relates to a method and apparatus for stacking lumber in a sawmill, and in particular relates to an apparatus capable of collecting, aligning, separating tiers and stacking rough sawn lumber or planed finished lumber into stacks of varying widths and thickness, with the stacks having even sides and at least one even end, and at higher speeds as required by modern sawmills.

BACKGROUND OF THE INVENTION

Conventional lumber stackers have been refined over the years so as to operate quite adequately under basic situations, but are found to be inadequate when it comes to stacking at higher speeds and are not very versatile. The problems that are encountered are mostly in the feeding, separating and subsequent stacking of the tiers of rough sawn lumber into an even stack. There are fewer problems encountered when dealing with lumber that has been planed which is uniform in width and height, but when the lumber being stacked is of varying widths and slightly varying in thickness and bowed (as may be more predominant in modern curve sawing mills), cupped or crooked, it becomes increasingly difficult to create acceptable stacks with known stackers of the general type. There have been some attempts at solving these problems in the past, but these devices are usually limited in their success when the lumber being stacked is not uniform in size and shape, and when the stacking speeds are increased.

An example of an improved lumber or board stacker is U.S. Pat. No 4,892,458 which issued to Prouix on Jan. 9, 1990. Although this system is somewhat successful at delivering lumber at higher speeds, it is complex and requires a large area (which is not always available), and it is not designed for stacking rough sawn lumber.

Applicant is also aware of U.S. Pat. No. 2,861,702 issued to Mason on Nov. 25, 1958. This device considers the need to stack slight varying lumber widths (rough lumber) and yet obtain a consistent width of package. This device is not however capable of satisfactorily high speed stacking and is not capable of stacking variable widths of stacks.

Applicant is also aware of U.S. Pat. No. 2,730,247 issued to Lawson on Jan. 10, 1956. This device considers the need to stack varying lumber widths (rough lumber) and yet obtain a consistent width of package. Again, the Lawson device would not be capable of satisfactorily stacking at high speeds and is not capable of stacking variable widths of stacks, and would require quite a large area in the sawmill.

SUMMARY OF THE INVENTION
Overview of Operation

Lumber is first unscrambled, that is, each board is separate and aligned parallel to the next, perpendicular to the lumber flow on an inclined unscrambler. Next, the board is fed onto a plurality of spaced apart angled ending rolls. The ending rolls, which may be angled, abut the boards endwise against a live fence, where the boards then continue to move laterally onto a tier forming transfer table. A row of retractable hook stops stop the boards, and a continuous mat begins to form (each board being parallel and abutting the next board, edge to edge). The boards are then separated into tiers by an adjustable pincher (adjustable to different widths of tiers), which pinches the mat, to hold back the flow of lumber momentarily, at which time the first row of hook stops is retracted, which releases the formed tier. The tier then advances along a first chain transfer and moves on to the next transfer, the staging transfer, and up to the staging hook stops.

The staging hook stops hold the tier for timed release to the stacker hook, where it is held by the stacker hook stops for timed release to the stacker forks. The first transfer operates in concert with the stacker transfer, or independent of the stacker transfer. The first transfer normally runs at a higher speed than the stacker transfer, to collect the boards, form the tiers, and release the tiers in advance of the stacker transfer. The increased speed of the first transfer is needed in order to maintain a constant flow of tiers from the staging area. The first transfer is also capable of reversing in case of a pile-up or jam-up at or before the adjustable pincher. The stacker hook stops release the next tier as the stacker hoist is readied (lowered for next tier, or raised for first tier) to accept the next tier of lumber. At the same time the lugged stacker accelerator chain, which has advanced up to contact the back of the tier (as the tier was advanced up), then accelerates as does the stacker forks. The stacker forks increase speed once the tier is collected and the stacker forks have raised up to clear the stacker transfer chains. The tier is then advanced along with the stacker forks, thus rapidly advancing the tier out over the stack being formed. The motion of the stacker forks and the stacker accelerator chain is controlled so as to accelerate smoothly to avoid any displacement of the lumber in the tier.

The staging hook stop releases the next tier as soon as the first tier is under the control of the stacker forks, and the next tier advances up to the back of the accelerator chain lug (the same lug that has just accelerated the first tier), which has slowed. Once the first tier is past the stacker hook stops, the hook stops raise up in time to accept the next tier. The stacker hook stops hold the next tier until the stacker forks have placed the first tier and retracted, that is, returned. The stacker hook stops then retract. The stacker forks then begin to extend out again, along with the accelerator chain, which has circulated so its second lug is now behind the next tier (which is now on top of the stacker forks). Thus the accelerator chain is now advancing the next tier along with the stacker forks so as to be placed onto the stacker knees.

Floating skids, mounted above the tier of lumber and above the lugged tier accelerator chain, may be used to help prevent any vertical displacement by buckling, overlapping or shingling of the lumber, especially if the lumber in the tier being stacked has wane or is thin and if the speed of the stacker forks are maximized. Alternatively, in place of floating skids, a group of upper forks are provided which may be advanced along with, and adjustably positioned over, the lower forks (and the lumber on the lower forks). The upper forks hold the lumber in a positive manner allowing the tier to be advanced at faster speeds if needed. Further alternatively, in place of the overhead forks, a plurality of narrow endless circulating overhead belts may be provided, positioned over the stacking hoist knees, which may be actuated to move along with the lower forks to allow for increased speeds and improved control.

An alternative means of accelerating the tier along with the rapidly accelerating forks is an adjustable cog (or dog)

near the rear end of the forks which may be raised behind the tier to assist in positive advancement of the tier. The adjustable cog may be pawl-like, so as to allow the lumber to pass over, but rotating up as the tier moves past the cog. Alternatively, the adjustable cog may be raised along with the forks by a linkage, or other means, that lifts the back of the forks as the forks begin to extend out over the stack being formed.

As the stacker forks move out over the stacking hoist knees, the tier moves along with the forks and the stacker accelerator chain lug. Thus the tier advances out over the stacking hoist knees. As the tier moves out over the stacker hoist knees it is raised up by a stacker fork lift roll to clear the stack, and then lowered down to just above the stack, at which time the forks then retract and the tier is stripped off the forks by a row of fixed stops that are positioned at the end of and below the top of the stacking transfer and above the top of the stack. Thus, as the tier is stripped off of the forks and deposited on to the stack hoist, the fixed stops create a flush side to the stack.

It is also sometimes practical to use skewable fixed stops, known in the art, that permit a tier to be skewed in relation to the previous tier as the forks retract and the tier is being placed. A stack having skewed alternate tiers may be more easily separated, i.e. unstacked, by a tilt hoist without one tier hanging up on the tier below.

An alternate means is provided for forming a tier width prior to the staging transfer. This consists of a reversing transfer, which, when reversed, separates the boards thereby forming a tier. The tier is then advanced on the staging transfer to the staging hook stops. The reversing transfer may be adjustable about the separation point (for varying the tier widths) and may include a plurality of discs mounted next to the reversing transfer's out-feed sprockets. These discs may be slightly larger than the diameter of the sprockets and transfer chain, so as to assist in separating the tier from the last board in the event that the last board was straddling the separation point, and also to protect the board from chain damage as the transfer is reversed. The use of such a reversing transfer may be advantageous for forming wide tiers, for example, 8 feet of rough lumber. The wider the tier the more difficult it becomes to maintain an equal number of boards within each tier. Also, the reversing transfer alternative leaves the area above the transfer open, which is also helpful with wide tiers, as the operator may have to intervene in the event the last board skews as it is straddling the separation point. Thus, the operator can easily move the board up or back depending on the number of boards already in the tier just formed.

The apparatus of the present invention may also incorporate "boxing load forks", also known in the art, having adjustable stops, adjustable for the desired tier width. The boxing load forks are advanced out over the outer section of the stack, then set down to touch the top of the stack awaiting the arrival of the next tier. As laying down of the next tier is being completed, the outer stops move into position (for the desired tier width) and the boxing load forks retract to form a flush outer stack side. The boxing load forks are used for creating even package widths when the lumber is still in its rough form, as it is being stacked for drying. There is a gap created near the center of the stack (or an alternating gap to prevent a chimney effect in the kiln) by the boxing load forks to allow an even face to be created while stacking rough lumber. The gap is alternated between tiers by a cylinder that connects and the boxing load forks together adjusts them in or out a short distance so as to alternate the boxing load forks extension, thus alternating the gap that is being left near the center of the package.

If the stacker is a planermill installation, a simple movable outer stop known in the art allows the next tier to come out past the outer stack edge, to clear the fixed stop as the forks lower the tier. The movable outer stops are moved in against the stack to form a flush side to the stack of planed lumber as the forks are retracted and the tier is deposited.

The stacking cycle repeats until the stack is of the desired height at which time the hoist is lowered and the stack is transferred, whereafter the hoist may be elevated to begin receiving tiers again. Often a secondary stacker hoist known in the art can extend in to receive the next tier as soon as the primary hoist has lowered enough to clear the secondary hoist arms. The secondary hoist can thus begin receiving tiers while the primary hoist is delivering the completed stack to a roll transfer below.

SUMMARY OF THE INVENTION

In a method and apparatus for high speed variable tier width lumber stacking, a tier forming and handling device for forming and handling sequential tiers of lumber from a flow of elongate boards translated on a first conveyor in a first flow direction, wherein the boards are aligned along their length substantially perpendicularly to the first flow direction. The lumber tier forming and handling device comprises three functional components, namely:

(a) a mat forming means for collecting, by selectively actuable flow impeding means, the flow of elongate boards against the flow impeding means so as to form a mat of lumber having a downstream end adjacent the flow impeding means and an upstream end whereagainst the flow of elongate boards may continue to collect into abutting adjacent array;

(b) separating means for separating, along the first conveyor, at a selectively adjustable separation location, a tier of lumber from the downstream end of the mat of lumber;

(c) tier accelerating means for conveying and selectively variably accelerating the tier of lumber, once separated along the first conveyor, from the first conveyor to a hoist stacker, in cooperating relation to stacker forks in said hoist stacker.

The selectively adjustable separation location is selectively adjustable along the first conveyor so as to selectively adjust a first dimension of the tier parallel to the first direction.

Advantageously, the stops are selectively elevatable hook flow impeding means, selectively actuable stops, in one embodiment elevatable into and out of flow impeding positions in the flow of elongate boards.

Further advantageously, the separating means are selectively adjustable pinching means for pinching either an upstream end of the mat of lumber, or for for pinching the downstream end of the mat of lumber. Alternatively, the separating means are flow reversing means, such as a reversing transfer, upstream of the mat forming means, mounted so as to engage a lower surface of the mat of lumber adjacently upstream of a separation point for selectively reversing the flow on the first conveyor along a selectively positionable length thereof and for a selectively adjustable length of time. Advantageously, the flow reversing means further comprises separation discs mounted at the separation point.

Further advantageously, the tier accelerating means comprises lower forks selectively engagable with a lower surface of the tier and cooperating with a selectively variably acceleratable second conveyor selectively engagable with the tier so as to accelerate the tier along with corresponding acceleration of the lower forks. The second conveyor may be a lug chain having an opposed pair of lugs in diametrically opposed relation on the lug chain, wherein the opposed pair of lugs are spaced apart around the lug chain by a distance at least equal to the first dimension of the tier.

In one aspect of the present invention, the separating means and the tier accelerating means comprises lower forks selectively engagable with a lower surface of the tier, the lower forks cooperating with upper forks selectively engagable with an upper surface of the tier, the upper and lower forks selectively acceleratable to accelerate the tier when the tier is clamped between the upper and lower forks. Advantageously, the upper and lower forks are generally parallel and selectively translatable on selectively actuable carriage means, and the selective engagement of the upper forks with the upper surface of the tier is selective vertical translation.

In a further aspect, the pinching means is a lateral array of elongate rigid skid members upstream of the mat forming means, selectively translatable relative to the first conveyor for selectively pinching the flow of elongate boards onto the first conveyor to thereby impede the flow. The rigid skid members may be selectively pivotally rotatably mounted to a support positioned over the first conveyor.

In a further aspect, the mat forming means, the separating means, and the tier accelerating means comprises upper and lower forks selectively engagable into clamped engagement with corresponding upper and lower surfaces of the tier, the upper and lower forks selectively acceleratable to accelerate the tier when the tier is clamped between the upper and lower forks. Again, advantageously, the upper and lower forks are generally parallel and selectively translatable on selectively actuable carriage means.

In yet a further aspect of the invention, the tier forming and handling device includes tier stabilizing means for inhibiting buckling, overlapping or shingling of adjacent boards in the tier. The tier stabilizing means may be selectively rotatable overhead circulating belts, rotatable in downwardly pressing engagement with an upper surface of the tier, or the tier stabilizing means may be second skid members or tier stabilizing skids, downstream of the mat forming means, translatable relative to the tier accelerating means and the tier for resting engagement of the second skid members on an upper surface of the tier. The upper and lower forks, selectively engagable into clamped engagement with corresponding upper and lower surfaces of the tier, may also provide tier stabilizing means as the tier is clamped between the upper and lower forks.

BRIEF DESCRIPTION OF THE DRAWINGS

The invention will be better understood by reference to the accompanying drawings, wherein.

DETAILED DESCRIPTION OF PREFERRED EMBODIMENTS

Referring to the drawing figures wherein similar characters of reference represent corresponding parts in each of several views, the apparatus is generally indicated by the reference numeral 10.

Figure 1:
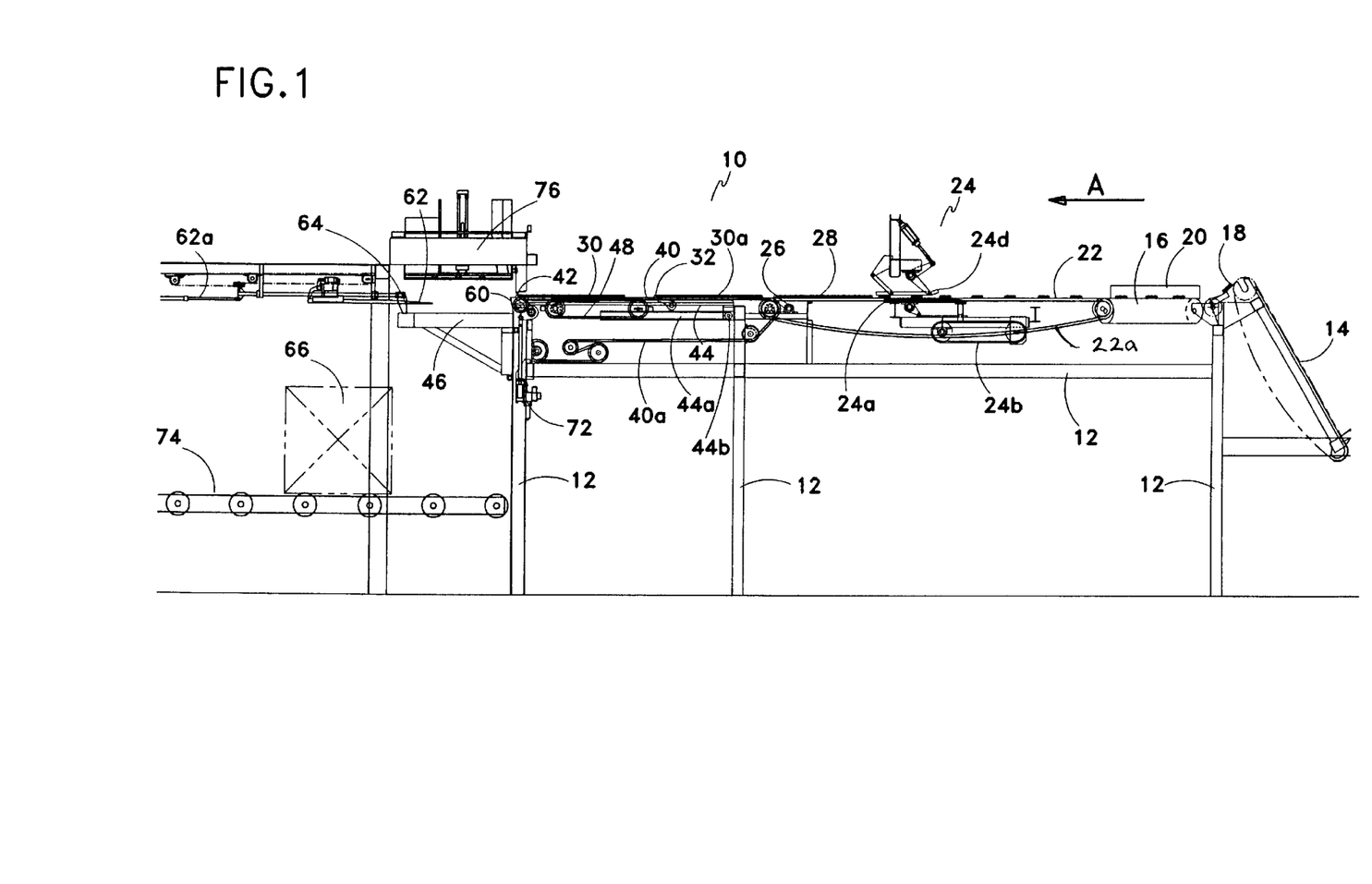
FIG. 1 is a side elevation view according to a preferred embodiment of the invention.
Figure 2:
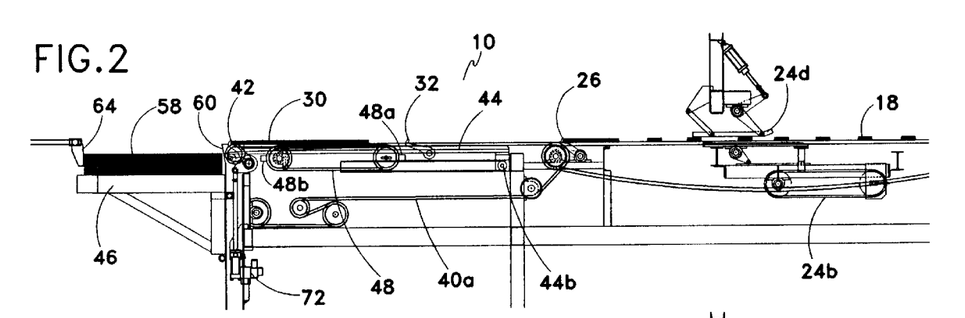
FIG. 2 is a side elevation view of the device of FIG. 1 showing a tier being formed at the tier forming hook stops, and a tier at the stacker hook stops, with the lugs on the lugged accelerator chain in the neutral position, and showing a lumber package being formed by the apparatus.

As seen in FIGS. 1 and 2, in a preferred embodiment, apparatus 10 includes a support frame constructed of various vertical and horizontal structural supports 12. Workpieces flow on apparatus 10 in direction A. An unscrambler 14 delivers lumber to a plurality of angled ending rolls 16. Angled ending rolls 16 evenly end boards 18 on to a live fence 20. The boards 18 are transferred from the ending rolls onto a first transfer 22. First transfer 22 includes transfer chains 22a.

Figure 6:
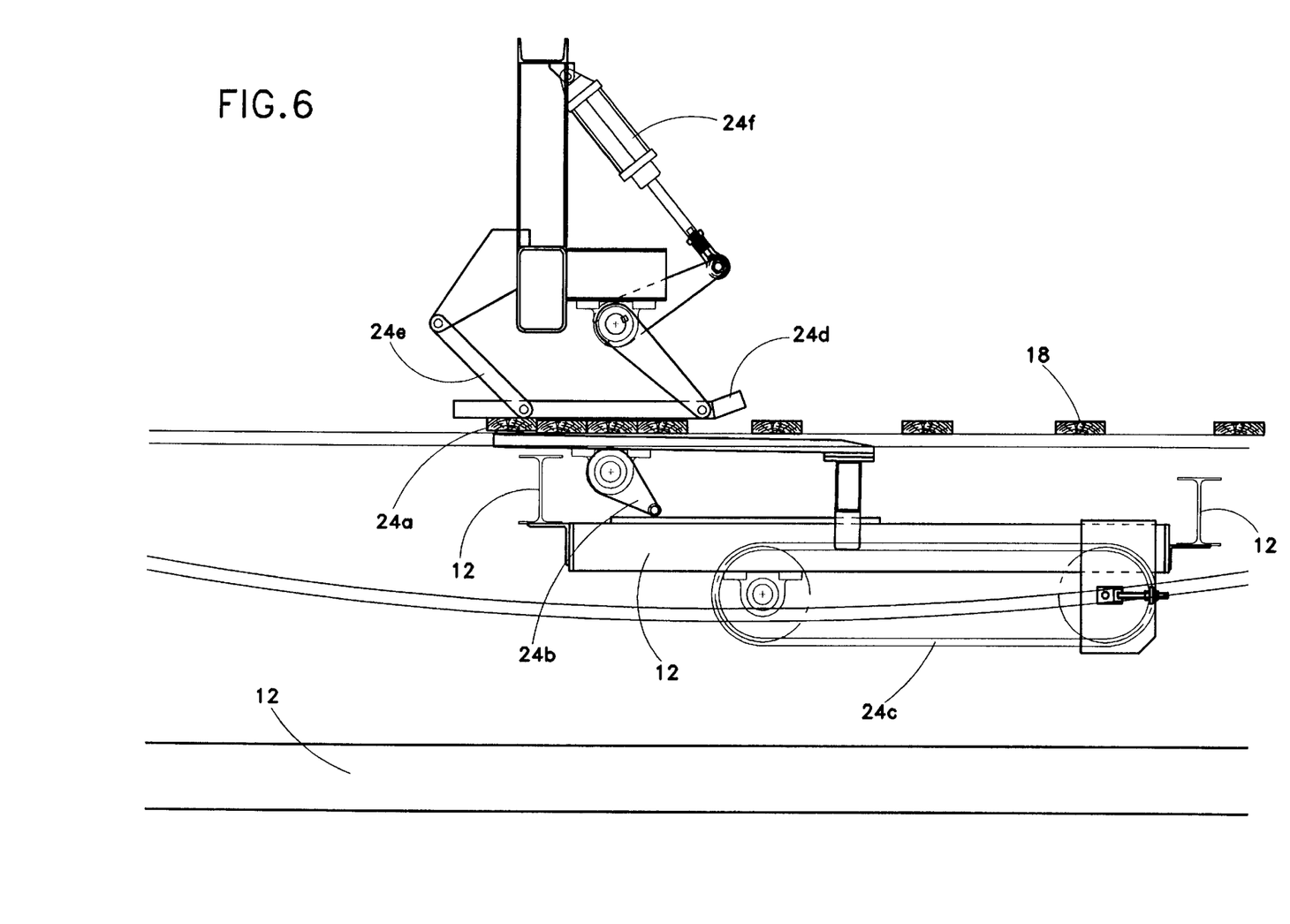
FIG. 6 is an enlarged, fragmentary side elevation view of the device of FIG. 1 showing the adjustable pincher having separated a tier.

The boards 18 are translated through adjustable pincher 24, adjustable for different widths of tiers, whereafter the boards 18 translate to the first row of hook stops 26. The first row of hook stops 26 are biased up in an elevated position so as to form a lumber mat 28, where the lumber mat 28 is then separated into a tier 30 by adjustable pincher 24 as is best seen in FIG. 6, which pinches the lumber mat 28, to hold back the flow of lumber momentarily. As the first row of hook stops 26 are retracted, which releases the formed tier 30, the tier 30 then advances along the first chain transfer 22 and moves up to the staging hook stops 32. Adjustable pincher 24 includes a lower pincher jaw 24a, a pincher jaw raising lobe 24b, an adjuster chain 24c, a movable upper pincher jaw 24d, an upper pincher jaw linkage 24e and an upper pincher jaw cylinder 24f.

Figure 3:
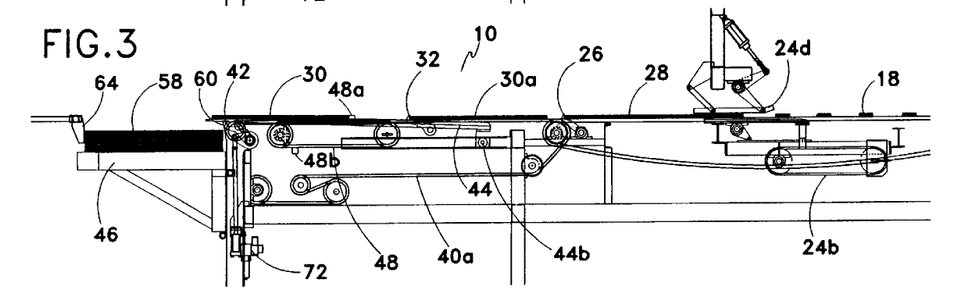
FIG. 3 is a side elevation view of the device of FIG. 1 showing a tier being pinched at the tier forming pincher, and a tier after having advanced to the staging (second) hook stops, and being held by the staging hook stops, and a tier being advanced over the retracted stacker hook stops and a lug on the lugged accelerator chain having moved up behind the first tier and advancing the tier with the advancing stacker forks as the forks lift and beginning to extend.
Figure 4:
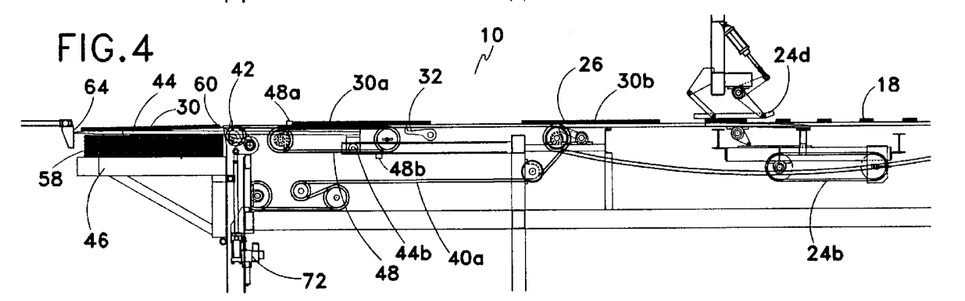
FIG. 4 is a side elevation view taken from FIG. 1 showing a tier being deposited onto the stack on the stacker hoist knees, as the forks carry the tier up, out and then down to place the tier, while a tier having been released by the staging hook stops, advances up to the lug on the accelerator chain, at the same time as a tier (just formed) is released by the tier forming hook stops.

Referring again to the preferred embodiment of the apparatus 10, as illustrated in FIGS. 2–4, the stacker forks 44 begin to move out over the stacking hoist knees 46, the tier 30 moves along with the forks 44 and the stacker accelerator chain lugs 48a, thus advancing the tier 30 out over the stacking hoist knees 46. The next tier 30a which is now waiting at the staging hook stops 32 is then released just after the first tier 30 has been advanced from the retracted stacker hook stops 42. Where the second tier 30a then comes into contact with the back of accelerator chain lugs 48a. Accelerator chain lugs 48a are moving but at a slower speed which maintains a gap between tiers. Stacker hook stops 42, are retracted as tier 30 is moved out over the stacker hoist knees 46, on top of stacker forks 44. Stacker forks 44 raise up clearing the partial stack 58, and extend to move tier 30 slightly out past the partial stack 56. The stacker forks 44 then lower down to just above partial stack 56, at which time the stacker forks 44 then retract and the tier 30 is stripped off the forks 44 by a row of fixed dead stops 60, are positioned at the end of, and below, the top of the stacker transfer chain 40. Thus as the tier 30 is stripped off of the forks 44 and deposited on to the stacker hoist knees 46 (or onto the partial stack 58), the fixed stops 60 create a flush inner side to the partial stack 58.

As described above, a gap is maintained between tiers 30 and 30a allowing stacker hook stops 42 to raise up (just after the tier 30 has passed) in time to stop the tier 30a advancing on chain lugs 48a. Chain lugs 48a circulate under and around, chain lugs 48b come up and around into position behind tier 30a. Tier tier 30a is then ready for release to stacker forks 44.

The staging hook stops 32 hold tier 30 for timed release to stacking transfer 40. Once released, tier 30 is moved up to stacking hook stops 42, where tier 30 is held for timed release to stacker forks 44, also seen in enlarged view in FIG. 5. Stacker forks 44 may be selectively translated along tracks 44a by selective sliding of trolley 44b there along. The first transfer 22 operates in concert with the stacker transfer 40, or independent of the stacker transfer 40, in case the first transfer 22 needs to be reversed or slowed down in the event of a jam or potential jam. The first transfer 22 normally runs at a higher speed than stacker transfer 40, so as to collect the boards 18, form the tiers 30 and release the tiers 30 in advance of stacker transfer 40. The increased speed of the first transfer 22 is needed in order to maintain a constant flow of tiers from the staging and stacking area of the first transfer 22. Drive belt 40a is the drive belt for stacker transfer 40.

Figure 5:
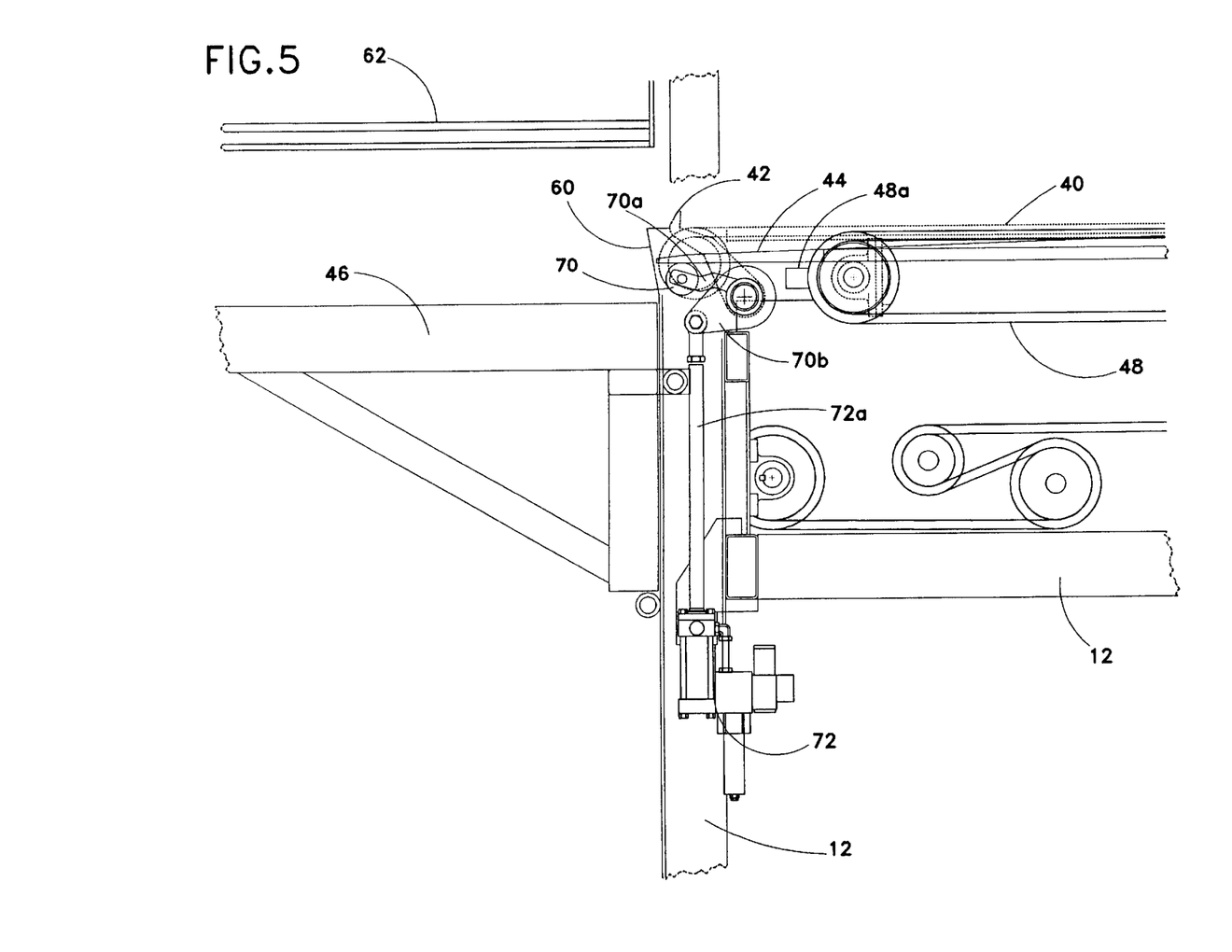
FIG. 5 is an enlarged, fragmentary side elevation view of the device of FIG. 1 showing the stacker hook stop and stacker fork lifting roll.

The stacker hook stops 42 release the next tier as the stacker hoist 46 is readied (lowered for next tier, or raised for first tier) to accept the next tier of lumber. At the same time logs 48a on lugged stacker accelerator chains 48, have advanced up to contact the back of tier 30 as the tier was advanced up to stacker hook stops 42. Accelerator chains 48 then accelerate with, so as to match the same speed of, stacker forks 44, so that tier 30 is advanced along with stacker forks 44, thus rapidly advancing tier 30 out over stacker hoist 46. The motion of the stacker forks 44 and the stacker accelerator chains 48 is controlled so as to accelerate smoothly to avoid any displacement of the lumber in the tier. Stacker forks 44 are raised up over dead stops 60 by stacker fork lifting rolls 70. Stacker fork lifting rolls 70 are mounted on stacker fork lifting roll linkage 70a, which is in turn mounted to so as to be actuated by actuation of stacker fork lifting roll cylinder linkage 70b. Cylinder linkage 70b is actuated by stacker fork roll lifting cylinder 72.

Figure 7:
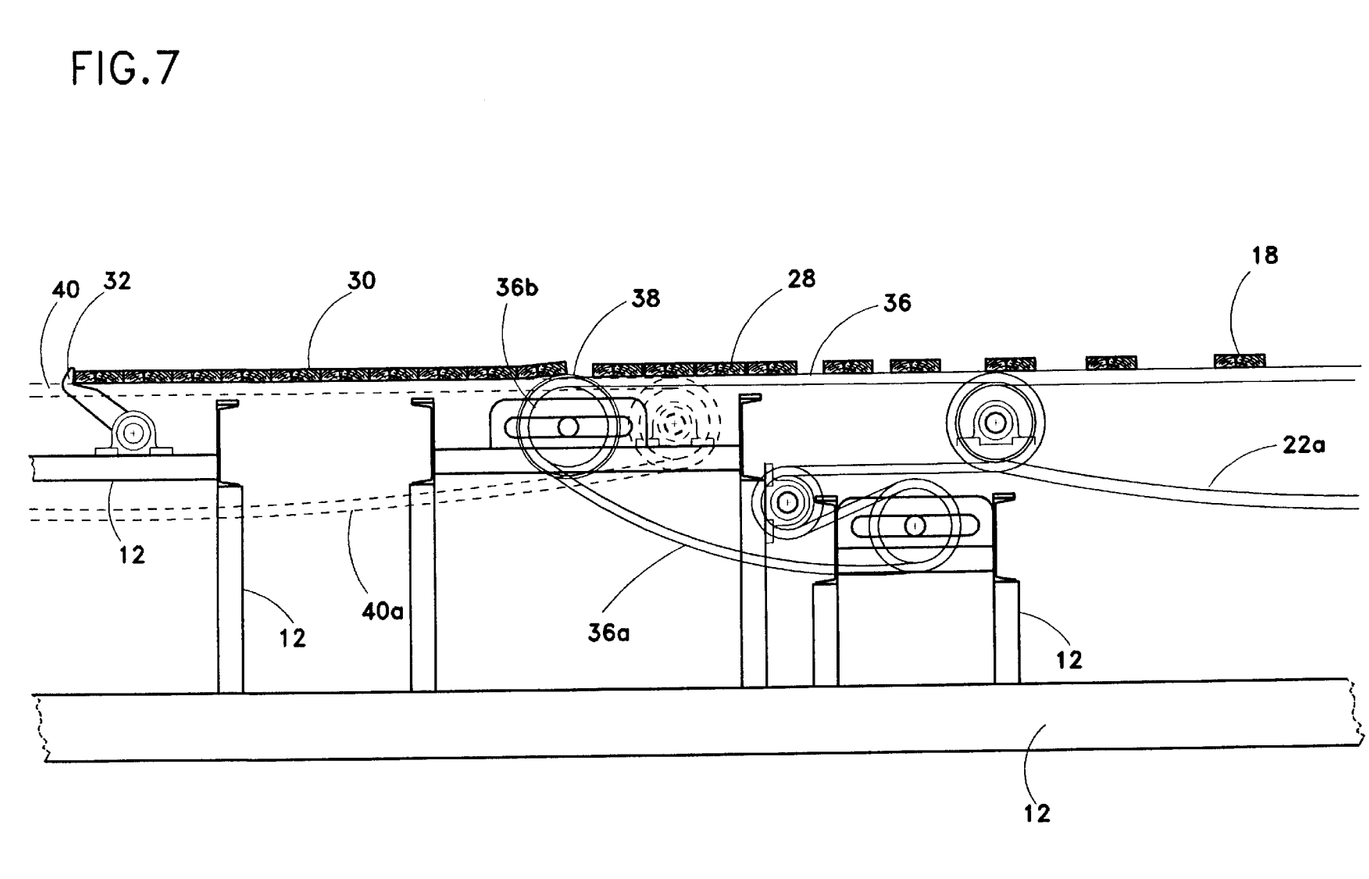
FIG. 7 is, in an alternative embodiment, a side elevation view of a reversing transfer.

As is best seen in FIG. 7, an alternative embodiment of the present invention provides an alternative means for forming a tier width prior to the staging transfer, namely reversing transfer 36. Reversing transfer 36, when reversed, separates, at a separation point, the boards 18 forming tier 30 from those in mat 28. The reversing transfer 36 is adjustable so that the separation point may be moved along the transfer to allow for varying the tier widths a plurality of separation discs 38 are mounted beside, that is co-axially, the reversing transfer chain out-feed sprockets 36b. Discs 38 are slightly larger than the diameter of the reversing transfer chain out-feed sprockets 36b. This assists in separating tier 30 from mat 28 in the event that last board in the tier is straddling the separation point. This also protects boards 18 from chain damage as reversing transfer 36 is reversed. The use of such a reversing transfer would be advantageous for forming very wide tiers of rough lumber, i.e. up to 8 feet wide, as the wider the tier the more difficult it becomes to maintain an equal number of boards within each tier.

The use of reversing transfer 36 allows the area above the transfer to be open, which is helpful with wide tiers, as the operator may have to intervene in the event the last board skews as it is straddling the separation point. Thus the operator can easily move the board forward, or back, depending on the number of boards already in the newly formed tier 30.

Figure 8:
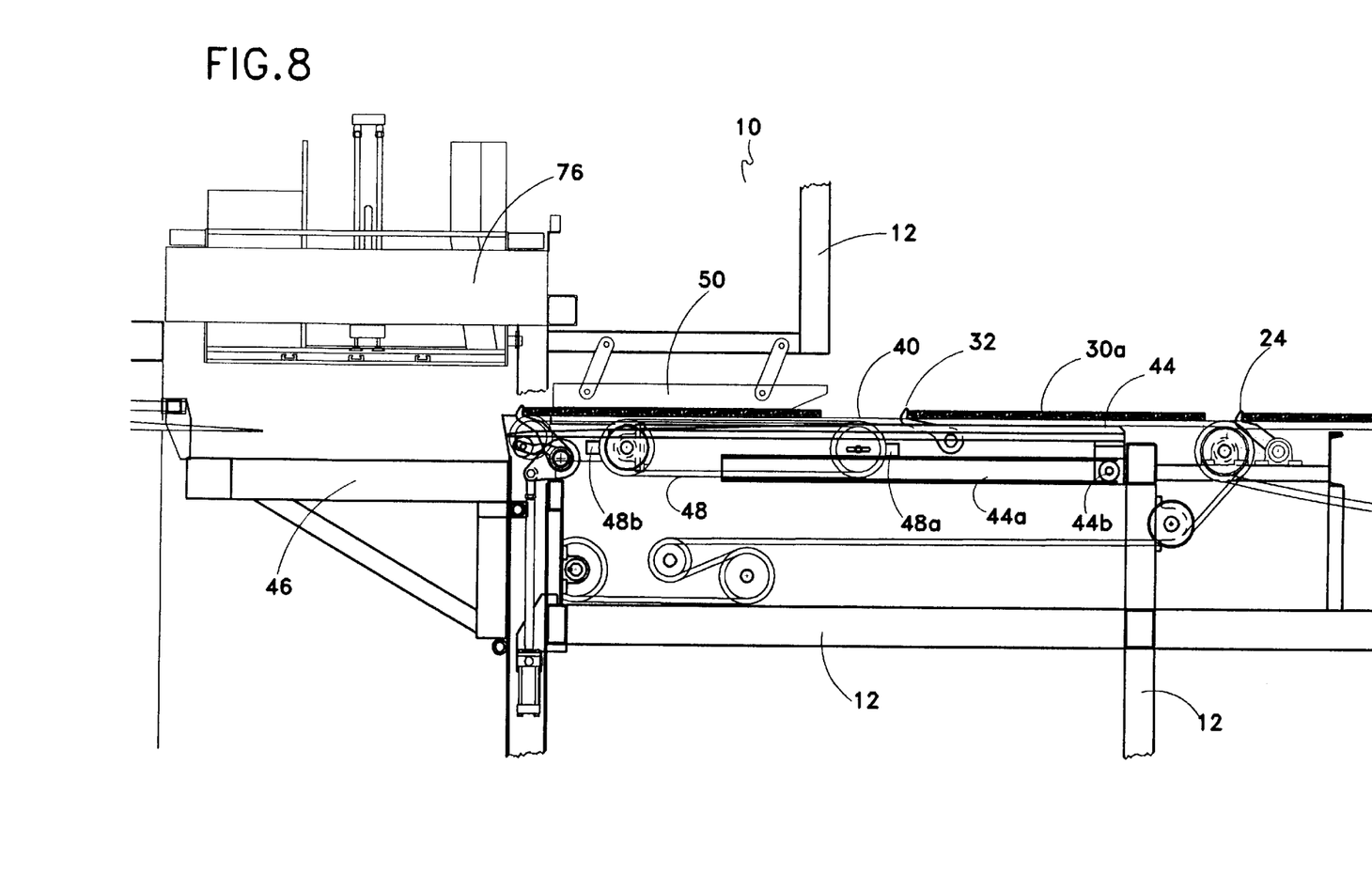
FIG. 8 is a side elevation view of an alternative embodiment incorporating floating skids.
Figure 9:
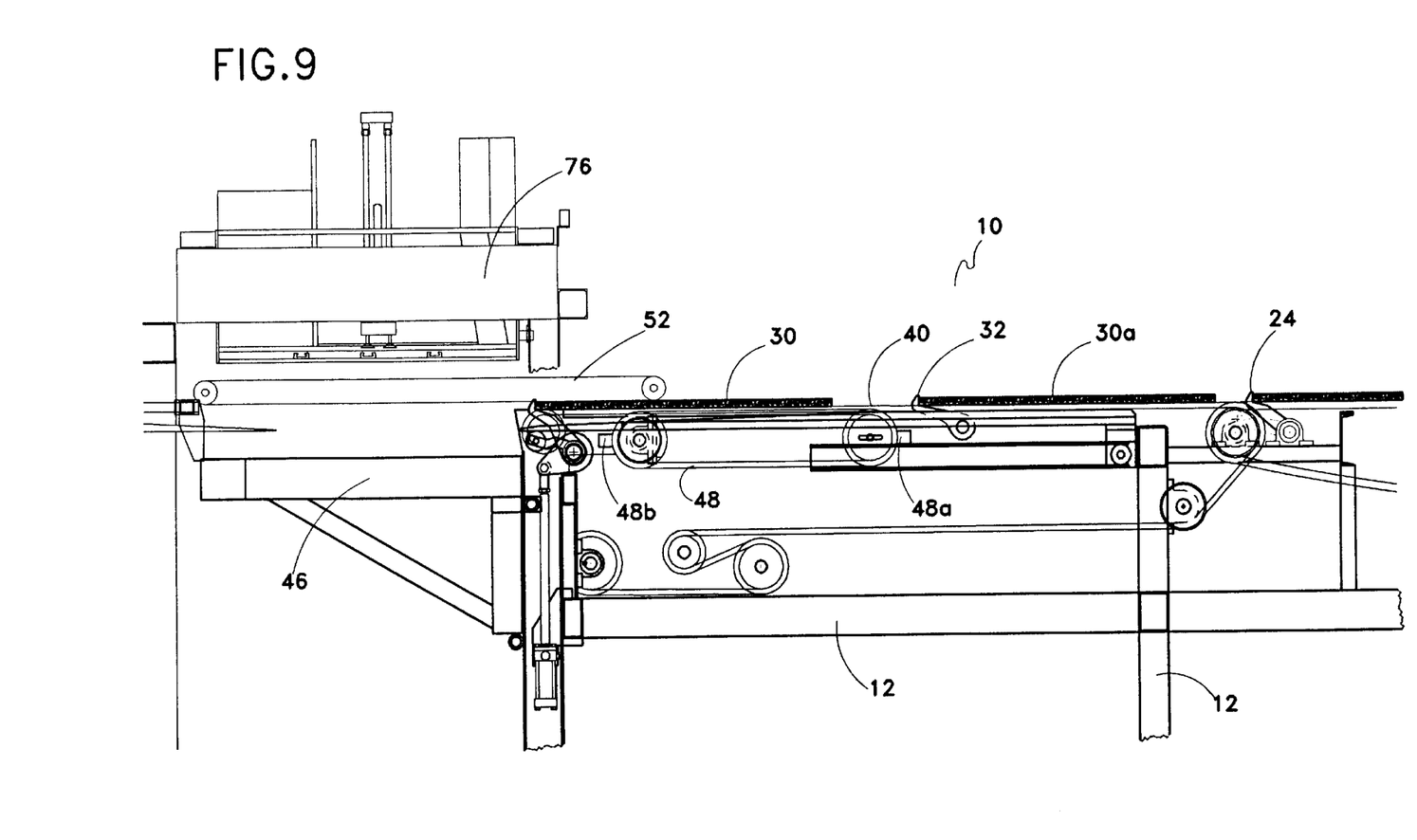
FIG. 9 is a side elevation view of an alternative embodiment incorporating alternate overhead belts.

As seen in FIG. 8, an optional device, a plurality of floating skids 50 may be used to help prevent any displacement of the lumber in tier 30 by buckling or overlapping, especially if the lumber being stacked is thin and if the speed of the stacker is maximized. Another optional device is seen in FIG. 9. Instead of the use of floating skids 50, a plurality of narrow endless circulating overhead belts 52 extend out over stacking hoist 46. Belts 52 move at variable speeds, so as to correspond to the speed of translation of the lower forks, to thereby allow for increased speed and control of tier 30 as it is moved out over partial stack 58. Endless circulating overhead belts 52 may be used in combination with the accelerator chains 48, or in place of accelerator chains 48, and as described above, as a tier splitting device.

Figure 10:
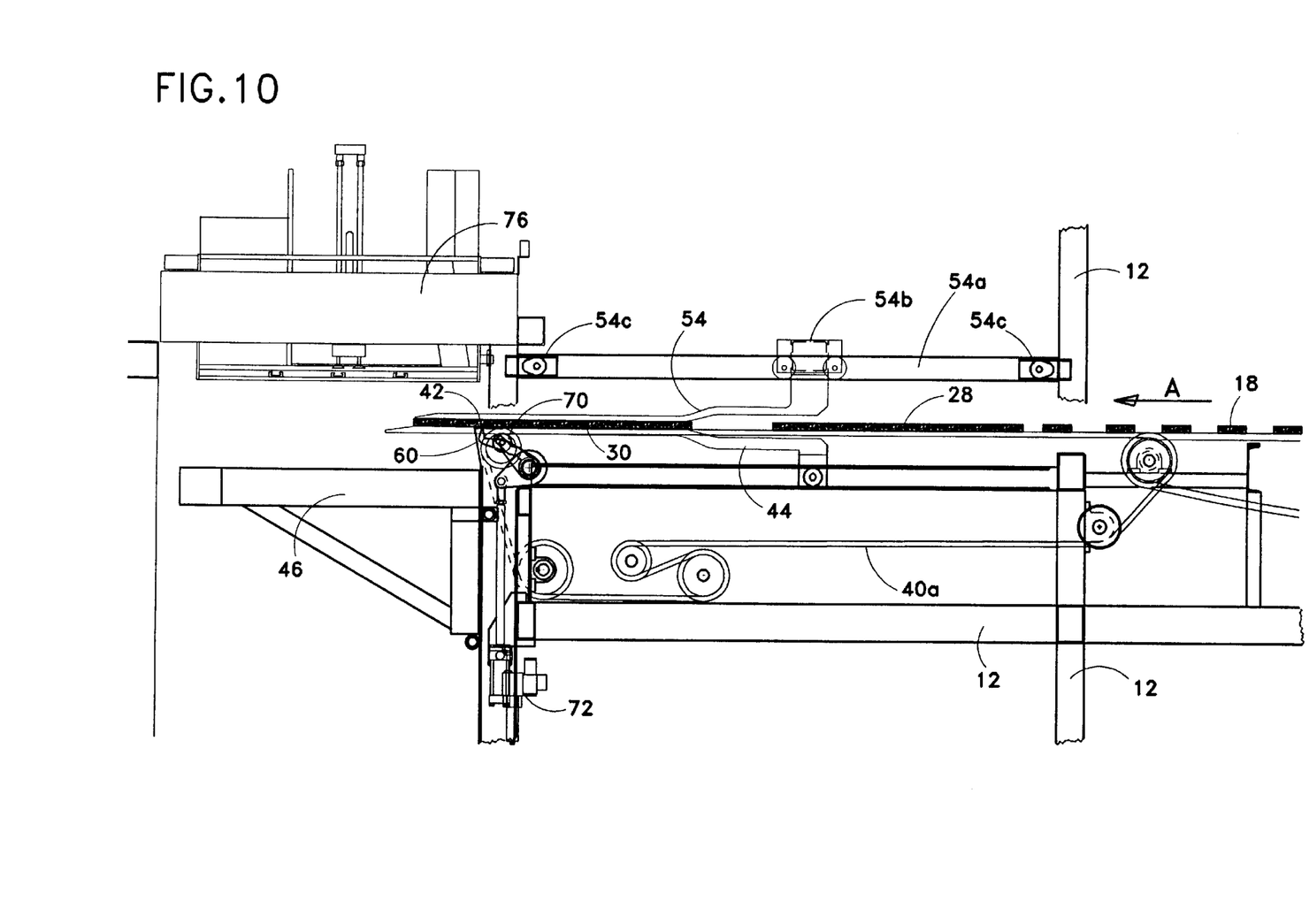
FIG. 10 is a side elevation view of an alternative embodiment incorporating overhead forks.

In a further alternative embodiment, as seen in FIG. 10, a plurality of overhead upper forks 54, advantageously of lighter construction than stacker forks 44 and correspondingly positionable over stacker forks 44, are slidingly mounted so as to be adjustably positioned for different tier widths and so as to be selectively advanced along with, lower forks 44. The upper and lower forks, 54 and 44 respectively, act as: (a) a means for pinching to lumber to form a tier from a mat of lumber accumulating on the transfer chain; (b) a means for creating a gap in the mat of lumber so as to separate one tier from the next following tier; and, (c) a means for inhibiting buckling, overlap or shingling between adjacent boards in the tier.

Upper forks 54 and lower forks 44 cooperate to hold lumber 18 within tier 30 in a positive manner, allowing tier 30 to be advanced at even faster speeds than might be obtainable without an overhead stabilizing mechanism such as overhead forks, belts or other pinching and conveying means. Upper forks 54 cooperate with lower forks 44 to pinch and form tiers 30, as well as to accelerate tiers, thereby eliminating the need for the tier accelerator lug chain 48 and the upstream tier forming mechanism. In operation the upper and lower forks 54 and 44 pinch a tier 30 from the downstream end of lumber mat 28. Lumber mat 28 forms by reason of transfer of lumber 18 in direction A against hook stops 42 when hook stops 42 are in the elevated position. Once tier 30 has been firmly pinched so as to be held between upper and lower forks 54 and 44, hook stops 42 are lowered and the upper and lower forks, with tier 30 therebetween, accelerated out over stacker hoist 46. Once upper and lower forks 54 and 44 clear hook stops 42, hook stops 42 are elevated so as to catch lumber mat 28 as it translates in direction A to fill the void left by removal of tier 30. While upper and lower forks 55 and 44 are being translated out over stacker hoist 46, so as to deposit tier 30, and being returned, lumber mat 28 translates in direction A against hook stops 42 and lumber 18 also translates in direction A to add to the upstream end of lumber mat 28. Once upper and lower forks 54 and 44 return the cycle repeats. Upper forks 54 are mounted on trolley track 54a by means of trolley 54b and height adjuster 54c. The height adjuster 54c allows for height adjustment for different thickness of boards, and also allows overhead forks 54 to be elevated in the event of a jam.

Figure 11:
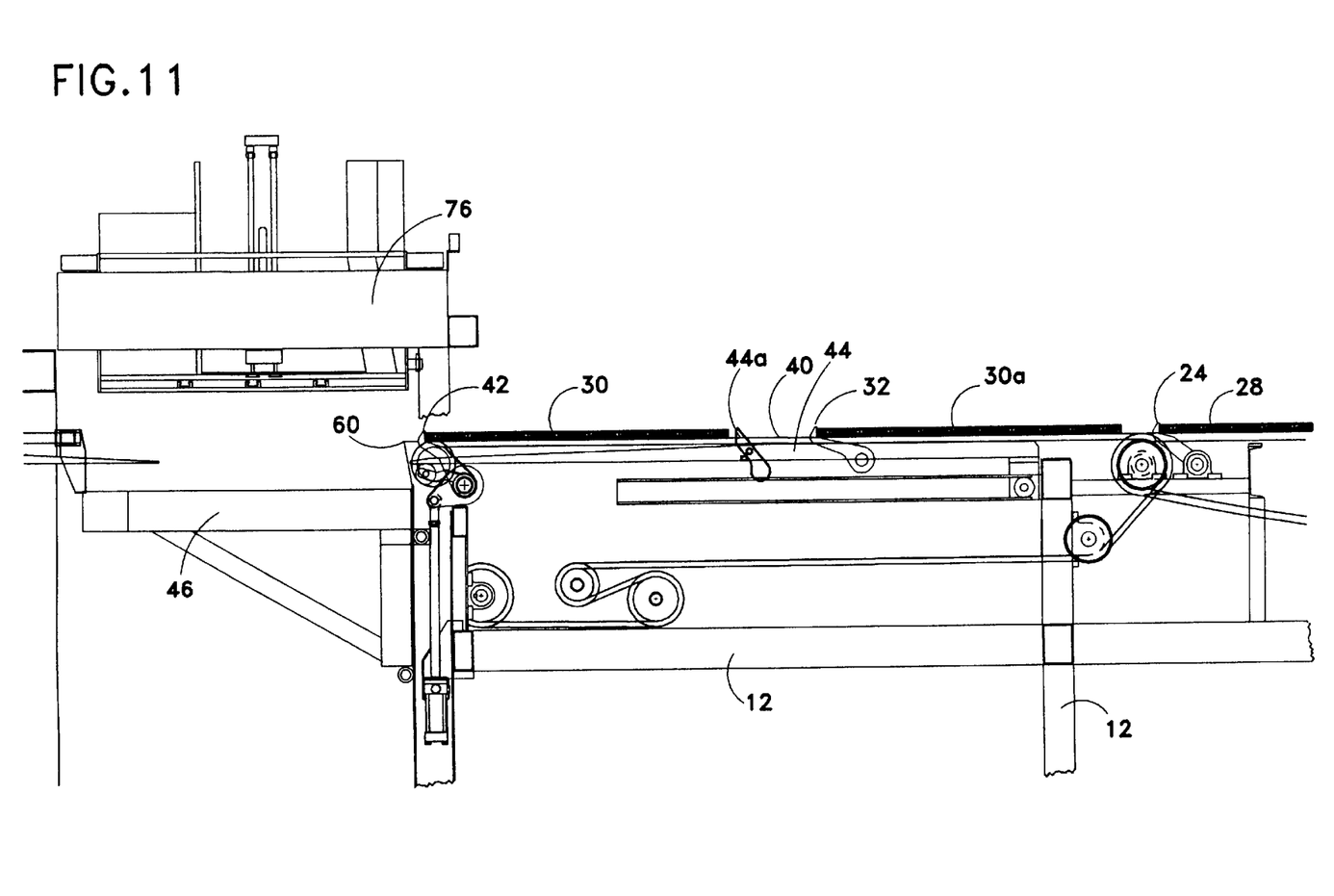
FIG. 11 is a side elevation view of an alternative embodiment incorporating fork cogs.

As best seen in FIG. 11, fork cogs 44a (or dogs) near the back end of the stacker forks 44 provide an alternate means of advancing the tier in stead of tier accelerating chain 48. The fork cogs 44a, raise up behind tier 30 (after the tier advances to the stacker hook stops 42) to assist in positive advancement of tier 30. The cogs 44a may be adjustable about the rear portion of the stacker forks 44, when the mill requirement is to handle widely varying tier widths, or may be stationary in the event of consistent tier width formation, specific to a given mill requirement. Cogs 44a may be pawl-like, allowing the lumber to pass over, then flipping up as the tier is moved past cogs 44a, or cogs 44a could raise up with the forks by a linkage or other means that lifts the back of the stacker forks 44 up as the stacker forks 44 begin to move out over the stacker hoist 46. If cogs 44a are adjustable back and forth along the rear portion of the stacker forks 44, a ball screw or other means may be employed to achieve this, while still remaining compact enough to move with the stacker forks 44. This embodiment would still require that the tiers be formed prior to arriving at the stacker forks 44, but would decrease the complexity of the stacker.

The apparatus may use a known device called "boxing load forks referred to herein as boxing load forks 62. In the embodiment of FIG. 1, boxing load forks have adjustable stops 64, adjustable for the desired tier width. The boxing load forks 62 are advanced out over the outer section of the partial stack 58, then set down to touch the top of the partial stack 56 awaiting the arrival of the next tier. As the next tier is being laid down, the outer stops 64 move into position for the desired tier width and boxing load forks 62 retract to form a flush outer stack side. The boxing load forks are used for creating even widths on package 66. As as the lumber being stacked is to be dried, advantageously, there is a gap intentionally created during this stacking process near the center of the stack by boxing load forks 62. The gap is preferably an alternatingly offset positioned gap to prevent the chimney effect in a drying kiln. This allows an even face to be created while stacking rough lumber, or varying widths of lumber pieces (which will vary the tier width). The gap is alternated between tiers by a boxing load cylinder 62a that connects the boxing load forks 62 together, to adjust the boxing load forks 62, in or out a short distance so as to alternate the boxing load forks 62 reach, thus alternating the space that is being left near the center of the package 66.

If stacker 10 is a planermill installation there is just a simple known movable outer stop (not shown) that allows the next tier to come out past the outer stack edge, to clear the fixed stop as the stacker forks 44 lower the tier. The outer stops 64 are then moved in against the stack to form a flush side to the stack of planed lumber as the forks 44 are retracted and the tier is deposited. In most installations the stacker 10 includes a stick and/or lath placer 76 which places sticks or lath (not shown) as required for stack stability or for lumber drying.

The cycle repeats until the stack 66 is of the desired height at which time the stacker hoist knees 46 are lowered to the outfeed rollcase 74, and the stack 66 is then transferred away from stacker 10. The stacker hoist knees 46 can the move up to begin receiving tiers again. There is often a secondary hoist (a known device) which can extend in, to start receiving the next tier as soon as the stacker hoist knees 46 have lowered enough for the package 66 to clear the secondary hoist arms (not shown). The secondary hoist can thus begin receiving tiers while the stacker hoist knees 46 are delivering the completed stack, package 66, to the outfeed rollcase 74 below.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A tier forming and handling device for forming and handling sequential tiers of lumber from a flow of elongate boards translated on a first conveyor in a first flow direction, wherein said boards are aligned along their length substantially perpendicularly to said first flow direction, said lumber tier forming and handling device comprising:

(a) mat forming means for collecting, by selectively actuable flow impeding means, said flow of elongate boards against said flow impeding means so as to form a mat of lumber having a downstream end adjacent said flow impeding means and an upstream end whereagainst said flow of elongate boards may continue to collect into abutting adjacent array;

(b) separating means for separating, along said first conveyor, at a selectively adjustable separation location, a tier of lumber from said downstream end of said mat of lumber;

(c) tier accelerating means for conveying and selectively variably accelerating said tier of lumber, once separated along said first conveyor, from said first conveyor to a hoist stacker, in cooperating relation to stacker forks in said hoist stacker, wherein said selectively adjustable separation location is selectively adjustable along said first conveyor so as to selectively adjust a first dimension of said tier parallel to said first direction.

2. The device of claim 1 wherein said flow impeding means are selectively actuable stops.

3. The device of claim 2 wherein said stops are selectively elevatable hook stops, selectively elevatable into and out of flow impeding positions in said flow of elongate boards.

4. The device of claim 1 wherein said separating means are pinching means for pinching said upstream end of said mat of lumber.

5. The device of claim 4 wherein said pinching means is a lateral array of elongate rigid members upstream of said mat forming means, selectively translatable relative to said first conveyor for selectively pinching said flow of elongate boards onto said first conveyor to thereby impede said flow.

6. The device of claim 5 wherein said rigid members are selectively pivotally rotatably mounted to a support positioned over said first conveyor.

7. The device of claim 1 wherein said tier accelerating means comprises lower forks selectively engagable with a lower surface of said tier and cooperating with a selectively variably acceleratable second conveyor selectively engagable with said tier so as to accelerate said tier along with corresponding acceleration of said lower forks.

8. The device of claim 7 wherein said second conveyor is a lug chain.

9. The device of claim 8 wherein said lug chain has an opposed pair of lugs in diametrically opposed relation on said lug chain.

10. The device of claim 9 wherein said opposed pair of lugs are spaced apart around said lug chain by a distance at least equal to said first dimension of said tier.

11. The device of claim 1 wherein said separating means and said tier accelerating means comprises lower forks selectively engagable with a lower surface of said tier, said lower forks cooperating with upper forks selectively engageable with an upper surface of said tier said upper and lower forks selectively acceleratable to accelerate said tier when said tier is clamped between said upper and lower forks.

12. The device of claim 11 wherein said upper and lower forks are substantially parallel and selectively translatable on selectively actuable carriage means, and wherein said selective engagement of said upper forks with said upper surface of said tier is selective vertical translation.

13. The device of claim 1 wherein said separating means are selectively adjustable pinching means for pinching said downstream end of said mat of lumber.

14. The device of claim 5 wherein said pinching means, and said tier accelerating means comprise upper and lower forks selectively engagable into clamped engagement with corresponding upper and lower surfaces of said tier, said upper and lower forks selectively acceleratable to accelerate said tier when said tier is clamped between said upper and lower forks.

15. The device of claim 14 wherein said upper and lower forks are substantially parallel and selectively translatable on selectively actuable carriage means.

16. The device of claim 1 wherein said separating means are flow reversing means for selectively reversing said flow on said first conveyor along a selectively positionable length thereof and for a selectively adjustable length of time.

17. The device of claim 16 wherein said flow reversing means is a reversing transfer, upstream of said mat forming means, mounted so as to engage a lower surface of said mat of lumber adjacently upstream of a separation point.

18. The device of claim 17 wherein said flow reversing means further comprises separation discs mounted at said separation point.

19. The device of claim 1 further comprising tier stabilizing means for inhibiting buckling, overlapping or shingling of adjacent boards in said tier.

20. The device of claim 19 wherein said tier stabilizing means are selectively rotatable overhead circulating belts, rotatable in downwardly pressing engagement with an upper surface of said tier.

21. The device of claim 19 wherein said tier stabilizing means are tier stabilizing skids, downstream of said mat forming means, translatable relative to said tier accelerating means and said tier for resting engagement of said tier stabilizing skids an upper surface of said tier.

22. The device of claim 19 wherein said tier stabilizing means, said separating means, and said tier accelerating means comprise upper and lower forks selectively engageable into clamped engagement with corresponding upper and lower surfaces of said tier, said upper and lower forks selectively acceleratable to accelerate said tier when said tier is clamped between said upper and lower forks.

23. The device of claim 22 wherein said upper and lower forks are substantially parallel and selectively translatable on selectively actuable carriage means.

* * * * *